(12) United States Patent
Larsen

(10) Patent No.: US 8,101,074 B2
(45) Date of Patent: Jan. 24, 2012

(54) PERMEATE TUBE

(75) Inventor: Knud Verner Larsen, Maribo (DK)

(73) Assignee: Alfa Laval Corporate AB, Lund (SE)

( * ) Notice: Subject to any disclaimer, the term of this patent is extended or adjusted under 35 U.S.C. 154(b) by 141 days.

(21) Appl. No.: 11/664,829

(22) PCT Filed: Oct. 19, 2005

(86) PCT No.: PCT/SE2005/001554
§ 371 (c)(1),
(2), (4) Date: May 19, 2009

(87) PCT Pub. No.: WO2006/043884
PCT Pub. Date: Apr. 27, 2006

(65) Prior Publication Data
US 2009/0294361 A1   Dec. 3, 2009

(30) Foreign Application Priority Data

Oct. 20, 2004 (SE) ........................ 0402542
Dec. 22, 2004 (SE) ........................ 0403169

(51) Int. Cl.
*B01D 35/00* (2006.01)
*B01D 61/00* (2006.01)
*B01D 69/00* (2006.01)

(52) U.S. Cl. ................ 210/232; 210/321.6; 210/321.74; 210/321.76; 210/321.83; 210/323.2; 210/437; 210/446; 210/455; 210/493.4; 210/497.01; 210/497.1; 210/498

(58) Field of Classification Search .................. 210/232, 210/321.6, 321.76, 321.74, 321.83, 321.85, 210/323.2, 437, 446, 455, 493.4, 497.01, 210/497.1, 498, 654; 428/34.1, 36.9
See application file for complete search history.

(56) References Cited

U.S. PATENT DOCUMENTS

| | | | | |
|---|---|---|---|---|
| 3,830,106 | A | * | 8/1974 | Gardiner et al. ........... 73/863.23 |
| 3,966,616 | A | | 6/1976 | Bray |
| 4,021,351 | A | * | 5/1977 | Bray .............................. 210/232 |
| 4,476,022 | A | * | 10/1984 | Doll .......................... 210/321.83 |
| 4,536,291 | A | * | 8/1985 | Hoffmann et al. ............. 210/457 |
| 4,715,952 | A | * | 12/1987 | Casey, Jr. ...................... 210/136 |
| 4,735,717 | A | | 4/1988 | Sims |
| 5,906,737 | A | | 5/1999 | Hoeppner |
| 2005/0121391 | A1 | * | 6/2005 | Koch ............................ 210/650 |

FOREIGN PATENT DOCUMENTS

| | | |
|---|---|---|
| DE | 10130716 A1 | 1/2003 |
| EP | 0347174 A1 | 12/1989 |

* cited by examiner

*Primary Examiner* — John Kim
(74) *Attorney, Agent, or Firm* — Michaud-Kinney Group LLP

(57) ABSTRACT

A permeate tube for spiral wound membrane comprising at least one tubular unit, which unit has spaced along its length a plurality of permeate transfer means, and one or more external grooves forming flow channels connecting the permeate transfer means. The present invention relates further to a process for treating a material having a viscosity less than 50 cP by the use of a spiral wound membrane comprising a permeate tube having at least one tubular unit, which unit has spaced along its length a plurality of permeate transfer means, and one or more external grooves forming flow channels connecting the permeate transfer means, around the permeate tube are one or more permeate transfer leaves, one or more membrane leaves and one or more space leaves wound. The present invention relates also to a process of operating a spiral wound membrane. The present invention relates further to uses of the spiral wound membrane.

22 Claims, 3 Drawing Sheets

PERMEATE TUBE

Present invention relates to a permeate collection tube for use in a spiral wound membrane, a spiral wound membrane, a process of operating a spiral wound membrane, a process for treating materials by the use of a spiral wound membrane and uses of the spiral wound membrane.

BACKGROUND OF INVENTION

Spiral wound membrane have often been produced by winding a membrane leaf or leaves, a permeate transfer sheet, and a spacer sheet around a perforated central collection tube.

A great number of spiral wound membranes are known from literature for example EP 0347174, U.S. Pat. No. 4,735,717 and U.S. Pat. No. 3,966,616, which documents disclose spiral wound membrane cartridges having collection tubes around which permeate transfer leaves, membrane leaves and space leaves are wound. U.S. Pat. No. 4,476,022 discloses a serrated product tube having perforations. A hollow tubular collection member provided with a plurality of randomly dispersed slots or apertures on its outer circumference is disclosed by U.S. Pat. No. 341,870, and U.S. Pat. No. 4,021,351 discloses a permeate collection tube fabricated from a plurality of interlocking tubular segments.

The central collection tube is the core around which the other cartridge materials are wound, and permeate is transferred from the membrane leaves to the interior of the collection tube. The central collection tube has heretofore been fabricated from a continuous length of commercially produced plastic tubing in which the required number of passages are provided by drilling holes or milling slits through the tube wall. While the raw material is not very expensive, the labour required for drilling or milling the number of transfer holes needed is great and costly.

Thus, one object of the present invention is to produce a less costly design of the spiral wound membrane and lessen the time of fabrication. Another object of the present invention is to improve the design of the spiral wound membrane and thus increase its performance. A further object is to improve the performance of the spiral wound membrane in connection with materials having higher viscosity.

Another further object is to improve the performance of the spiral wound membrane at lower temperatures.

Another further object is to improve the winding of membrane leaves around the core central collection tube.

THE INVENTION

Spiral wound membranes can be used for microfiltration, ultrafiltration, nanofiltration, or reverse osmosis. The permeate moves spirally inside the membrane to a collection tube, hereinafter defined as a permeate tube, and the collected permeate exits through one end or both ends of the tube. Microfiltration is the coarsest of the membrane filtration classes typically in the range of 0.1 to 10 micron (μm). Ultrafiltration membranes are classified by the molecular weight cut off which is defined as the molecular weight of the smallest molecule, 90% of which is retained by the membrane. Ultrafiltration range spans from 1000 to 500,000 molecular weight cut off. Nanofiltration membranes retain solute molecules having a molecular weight ranging from 100 to 1,000. Reverse osmosis involves the tightest membranes, which are capable of separating even the smallest solute molecules. Membranes are manufactured with a wide variety of materials, which include sintered metals, ceramics and polymers. The manufacturing processes result in a number of different membrane structures such as, micro-porous, asymmetric, composite, etc.

Spiral modules, spiral wound membranes or spiral wound membrane cartridges are manufactured by placing a woven plastic mesh which acts as the permeate channel between two membrane layers and sealing three sides. The fourth side of this sandwich is attached to the permeate tube. Another plastic mesh, which acts as the feed channel, is laid over it and the assembly is wrapped around the central permeate tube. This module also can withstand high pressures but is susceptible to fouling of feed channels by suspended particles.

The permeate is passing through the membrane layers or leafs for passage through a number of transfer means in the permeate tube. The permeate tube is suitably fabricated of relatively rigid material since it is the central hub or core around which the other cartridge elements are wound.

It has accordingly been found that the overall performance of a spiral wound membrane cartridge or spiral wound membrane can be improved by providing a permeate tube for spiral wound membrane, which comprises at least one tubular unit having a plurality of permeate transfer means spaced along the length of the unit, and one or more grooves connecting the permeate transfer means. The grooves are forming flow channels along the unit. Thus, the permeate tube of the invention is fabricated of one or more tubular units provided with a plurality of permeate transfer means for transporting permeate from the membrane layers or leafs into the interior of the unit. According to one embodiment the permeate transfer means may be holes, slits, slots, perforations, apertures etc. According to one alternative embodiment the transfer means may be slits. According to a further alternative embodiment the transfer means can be holes. The transfer means can be spaced equally or progressively along the length of the tube. According to one alternative embodiment the transfer means can be equally spaced along the length of the tube. The transfer means can be lined in one or more rows along the length of the tube, there may be one, two, three or four rows of transfer means. According to one alternative embodiment the transfer means can be lined in two rows. The tube can be provided along its length on the outside wall of the tube with one or more grooves forming flow channels, which transport permeate via the transfer means into the interior of the permeate tube. The grooves can be helically circled around circumference of the tube connecting the permeate transfer means, suitably there are one, two, three or four helical grooves forming flow channels connecting the permeate transfer means. According to one alternative embodiment there can be two helical grooves connecting the permeate transfer means. The grooves have a depth within the range of from about 0.25 mm to about 2.5 mm. According to one alternative embodiment the depth can be within the range of from about 0.5 to about 1.5 mm. According to another alternative embodiment the depth can be within the range of from 0.75 to 1.25 mm. The depth of the grooves may be within the range of 1:6 to 1:2 of the goods thickness of the permeate tube. According to one alternative embodiment the ratio of the depth to the goods thickness can be within the range of 1:5 to 1:2.5. According to another alternative embodiment the ratio can be within the range of 1:4 to 1:3.

The tube can be fabricated as one tubular unit having the permeate transfer means and the grooves forming the flow channels, or can be constructed by fitting together end-to-end two or more tubular units having the permeate transfer means and the grooves forming the flow channels. When there are more than one tubular unit then the tube can be fabricated out of two units having one end-part and one fitting-part joined together either without any other units or with one or more units having two fitting-parts depending on the length of the tube. According to one alternative embodiment the tube can be fabricated out of two units having one end-part and one fitting-part join together with one unit having two fitting-parts summing up to three tubular units.

The cross-section of interior of the tubular unit of the present invention can be at least partly circular or polygonal. When the cross-section is polygonal then it can be square, pentagonal, hexagonal, heptagonal or octagonal. According to one alternative embodiment the cross-section can be at least partly hexagonal or octagonal. According to another alternative embodiment the cross-section can be at least partly hexagonal. A polygonal cross-section enables easier handling when winding the membrane leafs around the permeate tube, enables saving of time, and also enables a tighter wounding of the cartridge without the need of extra tools or members. According to one alternative embodiment the polygonal cross-section can be placed in a part of the unit having at least one end-part. According to another alternative embodiment the cross-section is circular and in a part of the unit having at least one end-part there can be a notch in the circular cross-section to enable easier handling when winding the membrane leafs around the permeate tube.

The material of the tube may be of metal, composite material, plastic material, polymeric material, glass or glass fibre. According to one alternative embodiment the polymeric material can be selected from the group consisting of polyethylene, polyphenylene sulfide, polypropylene, acetal, acrylonitrile-butadienestyrene (ABS), ABS-polycarbonate alloys, polystyrene, polystryene-butadiene, polyetherimide, polyvinyl chloride, polysulfone, polyetheretherketone (PEEK) or poly(phenylene oxide), or mixtures thereof. According to another alternative embodiment any plastic material suited for injection moulding can be used.

The invention also provides a spiral wound membrane cartridge comprising a permeate tube having features defined above or a permeate tube defined as any of the above described embodiments. The spiral membrane cartridge of the present invention can be fabricated of a plurality of membrane leaves, a plurality of permeate transfer sheets, and a plurality of spacer sheets wound around the permeate tube.

There is also provided a method of manufacture of the above defined permeate tube. The method of the invention comprises:
  (i) pouring or injecting monomeric materials, i.e. monomers and/or co-monomers, into moulds having negative transcripts of one or more grooves forming flow channels and negative transcripts of plurality of permeate transfer means;
  (ii) polymerising the monomeric materials and forming units having two end-parts, units having one end-part and one fitting-part, and/or units having two fitting-parts; and
  (iii) optionally joining two or more tubular units moulded in stage (ii) end-to-end.

According to the invented method the tubular units can be moulded as one peace, or the units can be moulded as two elongated half sections of the tubular units. The two parts can be glued, solvent bonded or ultrasonic welded together on the elongated sides. According to one alternative embodiment the units can be moulded as one-peace. According to another alternative embodiment of the invented method the unit or tube can be moulded as one peace in a two-part mould three-part mould, or a four-part mould, which two parts of the mould can be extended along the length of the unit or tube and comprise negative transcript of the unit or tube.

The method may also include gluing, solvent bonding or ultrasonic welding together tubular units or parts to form the permeate tube.

The method of the invention also comprises joining one or more tubular units end-to-end, for instance two units having one end-part and one fitting-part, joining units, which are moulded in different moulds. Depending on the desired length of the finished permeate tube the method includes joining two units having one end-part and one fitting-part together with at least one unit having two fitting-parts.

According to the invention there is provided a process for operating a spiral wound membrane comprising a permeate tube having at least one tubular unit, which unit has spaced along its length a plurality of permeate transfer means, and one or more external grooves forming flow channels connecting the permeate transfer means, around which permeate tube one or more permeate transfer leaves, one or more membrane leaves and one or more space leaves are wound. According to one embodiment can spiral wound membrane operate at a temperature of at least 0° C. According to another embodiment can the spiral wound membrane operate at a temperature of about 2° C. or more. According to one alternative embodiment can the spiral wound membrane operate at a temperature less than about 120° C. According to a further alternative can embodiment the spiral wound membrane operate at a temperature less than about 100° C. According to a further alternative can embodiment the spiral wound membrane operate at a temperature less than about 90° C. According to a further alternative embodiment can the spiral wound membrane operate at a temperature within the range of from about 3 to about 100° C. According to another further alternative can embodiment the spiral wound membrane operate at a temperature within the range of from about 2 to about 55° C.

According to another alternative embodiment of the invention there is provided a process for treating a material having a viscosity less than 50 cP by the use of a spiral wound membrane comprising a permeate tube having at least one tubular unit, which unit has spaced along its length a plurality of permeate transfer means, and one or more external grooves forming flow channels connecting the permeate transfer means, around which permeate tube one or more permeate transfer leaves, one or more membrane leaves and one or more space leaves are wound. According to another embodiment can the material to be treated have a viscosity of at least about 0.3 cP. According to another alternative embodiment can the material to be treated have a viscosity of at least about 0.5 cP. According to another alternative embodiment can the material to be treated have a viscosity less than about 40 cP. According to another alternative embodiment can the material to be treated have a viscosity less than about 30 cP. According to another alternative embodiment can the material to be treated have a viscosity within the range of from about 0.3 to about 50 cP. According to another alternative further embodiment can the material to be treated have a viscosity within the range of from about 0.3 to about 40 cP.

According to one alternative embodiment can the process produce a permeate having viscosity within the range of from about 0.95 to about 1.05 cP at a temperature within a temperature range of from about 15 to about 30° C. According to another alternative embodiment can the process produce a permeate having viscosity within the range of from about 0.95 to about 1.05 cP at a temperature within a temperature range of from about 15 to about 30° C. for processes such as protein recovery or protein concentration.

The spiral wound membrane according to the present invention can be used for microfiltration, ultrafiltration, nanofiltration, or reverse osmosis. According to one alternative embodiment the membranes can be used for applications such as desalination. According to another alternative embodiment the membranes can be used for treating proteins, and protein products. According to another alternative embodiment the membranes can be used for treating milk and milk products. According to another further alternative embodiment the membranes can be used for treating polysaccharides and polysaccharide products. According to another further alternative embodiment the membranes can be used for treating starches and starch products. According to another further alternative embodiment the membranes can be used for treating oils, vegetable oils and oil products. Further embodiments of the invention are defined by the claims.

DETAILED DESCRIPTION OF EXAMPLES OF ALTERNATIVE EMBODIMENTS

Figure 1:
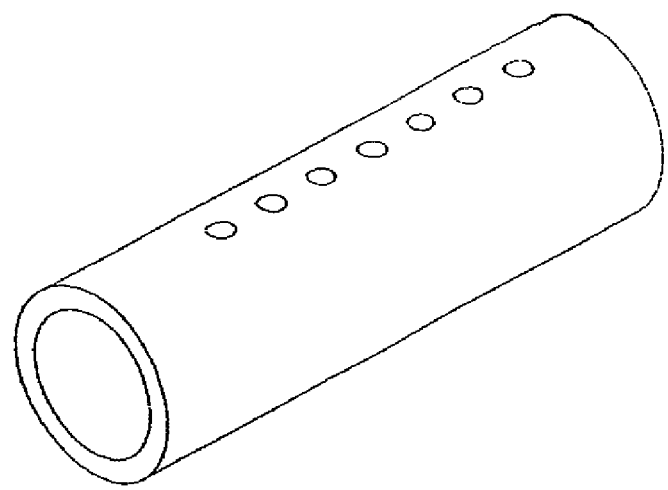
FIG. 1 is showing a permeate tube of the prior art.

A permeate tube of the prior art is shown in FIG. 1, the prior art tubes are usually made of rigid plastic tubes having a plurality of drilled holes along the length of the tube.

Figure 2:
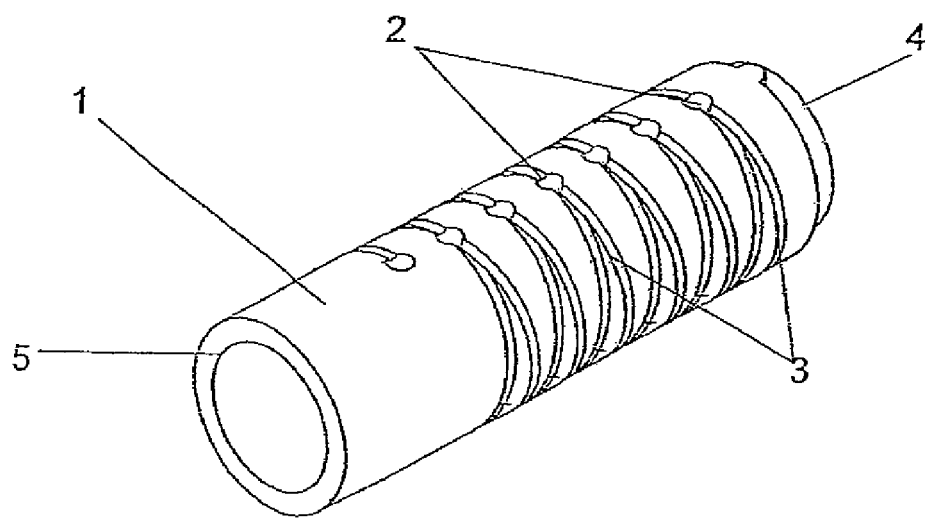
FIG. 2 is showing a part of a permeate tube as according to one alternative embodiment of the invention.
Figure 3:
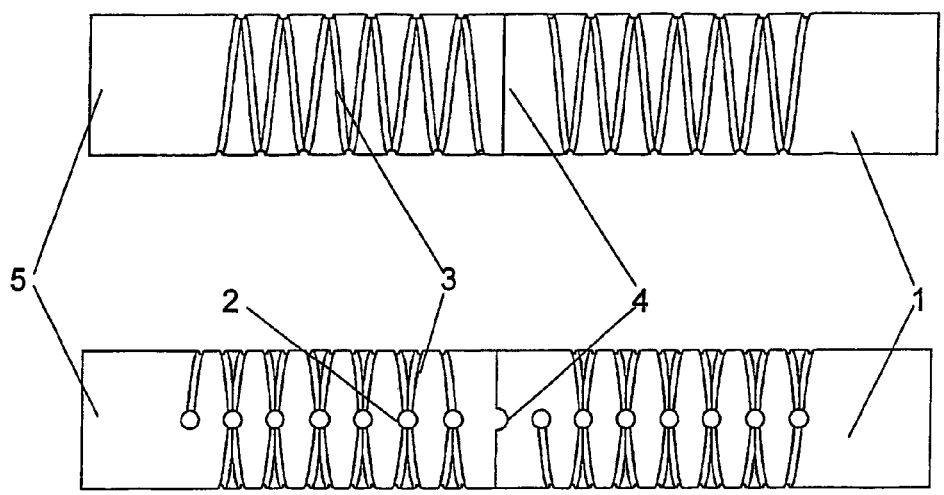
FIG. 3 is showing a top view and a side view of a permeate tube according to another alternative embodiment of the invention.
Figure 4:
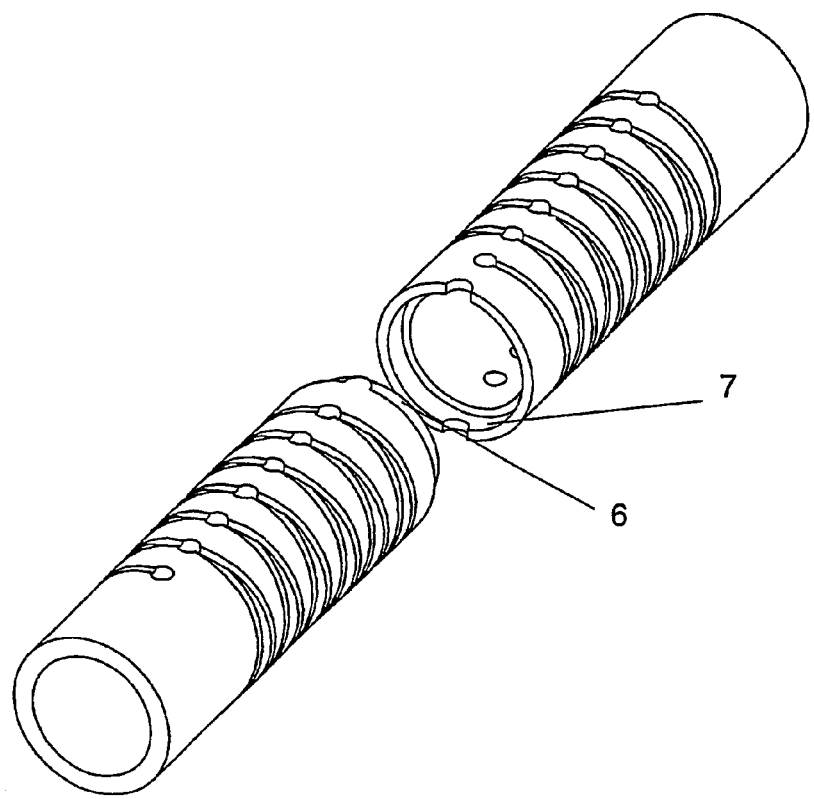
FIG. 4 is showing a two separated parts of a permeate tube according to one alternative embodiment of the invention.

One part or unit of a permeate tube according to one alternative embodiment of the invention is shown in FIG. 2. The permeate tube according to the invention comprises at least one tubular unit 1, having a plurality of permeate transfer means 2, which are spaced along the length of the unit, according to one alternative embodiment the permeate transfer means are holes 2. One or more grooves 3 are forming flow channels or flow paths circulating helically around the tube/unit and along its length. The flow channels are connecting the permeate transfer means, i.e. holes in FIG. 2. The holes are equally spaced along the length of the unit in for example two rows on diagonally opposite sides of the unit. The permeate tube according to one alternative embodiment can be constructed of three or more tubular units fitted together end-to-end, two units having one end-part 5 and a fitting-part 4, which fitting-part may be equipped with a steering-part, but not necessary, and at least one unit having two fitting-parts 4 one in each end of the unit, not seen in the figure. The one or more units having the two fitting parts are fitted between the two units having one end-part and one fitting-part. FIG. 3 is showing two end-parts fitted together, the figure is showing a side view and a top view of a permeate tube according to one alternative embodiment of the invention. Two detailed fitting-parts or inter-locking parts 6 and 7 are shown in FIG. 4. Inter-locking part 6 can be inserted into a corresponding inter-locking part 7 according to one alternative embodiment of the invention, each inter-locking part according to this embodiment having steering equipments.

Figure 5:
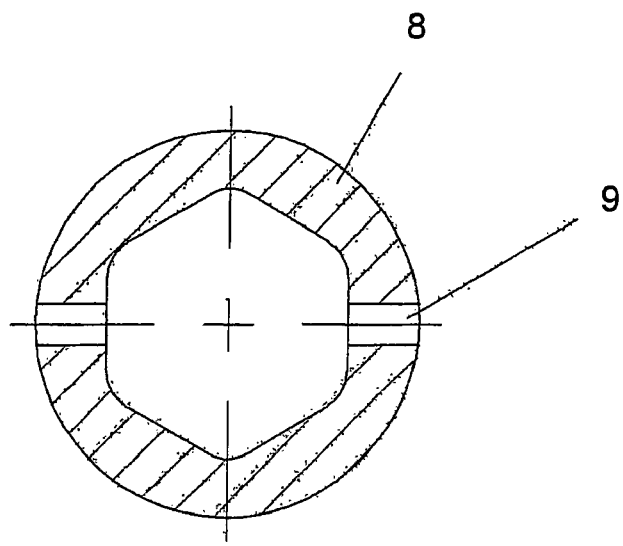
FIG. 5 is showing a cross-section according to one alternative embodiment of the invention.

According to one alternative embodiment of the invention may at least a part of the interior of tube 8 have a cross-section, which may be hexagonal, shown in FIG. 5, but the cross-section may be any type of polygonal cross-section. Tube 8 is having transfer means 9 connecting the circular outer side of the tube with the inner polygonal side.

Figure 6:
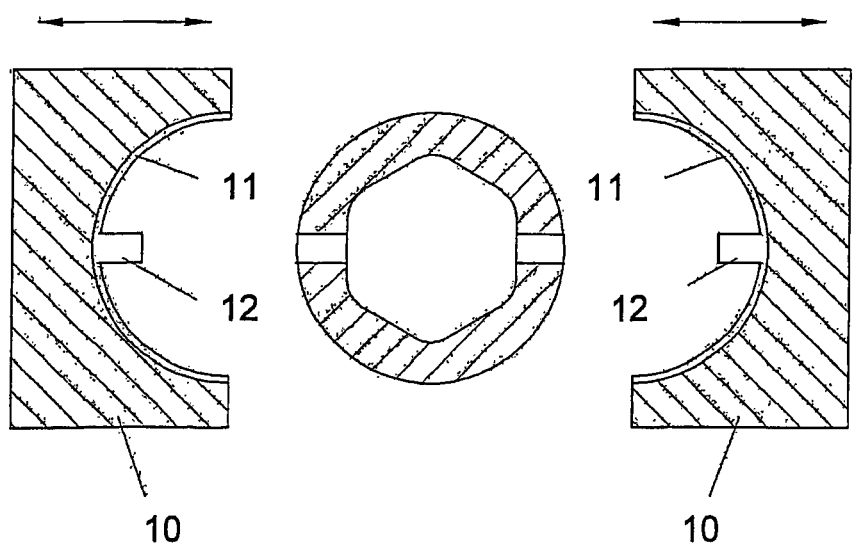
FIG. 6 is showing a cross-section according to one alternative embodiment and a mould in two-part form.

FIG. 6 is showing a view of a cross-section of a unit or a tube together with a two-part mould 10, which have means for negative transcripts 11 of one or more grooves 3 and plurality of negative transcripts of transfer means 12 to form permeate transfer means 2. The mould is constructed in two parts to enable easy dismounting from the unit or the tube, the mould may be any number of parts suitable for the desired design of the permeate tube. According to one alternative embodiment may the mould be a four-part mould, not shown in the figure. Negative transcripts of transfer means 12 may be constructed as one part or may be divided into two parts forming one transfer mean 2 in the produced permeate tube.

The present invention is now explained in further detail by means of Examples.

Between the membrane-leaf ends and the outer surface of the permeate tube there will be a pressure drop, which may cause a decrease in the performance of the membrane. The pressure influences both flow- and flux rates. Permeate flow is here defined as the volume of permeate that flows through a membrane in a unit time period. The permeate flow is measured in liters ($dm^3$) per hour.

Permeate flux is here defined as the volume of permeate that flows through a unit area of membrane in a unit time period. The permeate flux is measured in liters ($dm^3$) per square meter per hour.

In the following examples are investigations of the influence of pressure on flow rate and on flux rate carried out and comparisons are made between a spiral wound membrane of the prior art and the spiral wound membrane of the present invention. The purpose of the examples is to illustrate the performance of the permeate tube of the invention, and is not intended to limit the scope of invention.

Example 1

The permeate tube of the invention was tested against a standard permeate tube of the prior art, the permeate tube of the invention having two rows of holes and two helical grooves connected to the holes, and the standard tube having four rows of holes and no grooves. Around the tested permeate tubes were membrane leaves, permeate transfer sheets, and spacer sheets wounded. The tests were carried out parallel in pressure tubes. The pressures were measured into and out of the tubes by the ends of the tubes, giving an average pressure within the range of from about 2 Bar to about 10 Bar. The temperature was 20° C., the surrounding pressure was 1.0 Bar, and the cross-flow was 30 $m^3$/h during the test run. The results are summarised in Table 1.

TABLE 1

| | | Permeate tube of invention | | Permeate tube of prior art | |
| --- | --- | --- | --- | --- | --- |
| Time minutes | P Bar | Permeate flow $dm^3$/h | Permeate flux $dm^3/(m^2 \times h)$ | Permeate flow $dm^3$/h | Permeate flux $dm^3/(m^2 \times h)$ |
| 0 | 1.93 | 1550 | 92 | 1450 | 86 |
| 15 | 3.03 | 2300 | 137 | 2200 | 131 |
| 30 | 4.06 | 2750 | 164 | 2530 | 151 |
| 40 | 5.05 | 3025 | 180 | 2860 | 170 |
| 50 | 6.07 | 2970 | 177 | 2750 | 164 |
| 80 | 6.93 | 3190 | 190 | 3080 | 183 |
| 100 | 7.93 | 3630 | 216 | 3520 | 210 |
| 105 | 9.01 | 4070 | 242 | 3960 | 236 |
| 120 | 10.10 | 4510 | 268 | 4290 | 255 |

The test results show that the capacity of the permeate tube of the invention in respect to the drainage (flux) of the membrane is increased between 5 to 10% compared to the permeate tube of prior art. The performances of the tubes in respect to flow rates show the same results.

Example 2

The permeate tube of the invention was tested against a standard permeate tube of the prior art, the permeate tube of the invention having two rows of holes having a diameter of 4 mm, and two helical grooves connected to the holes, and the standard tube having four rows of holes having a diameter of 2.5 mm and no grooves. Around the tested permeate tubes were membrane leaves, permeate transfer sheets, and spacer sheets wounded. The tests were carried out parallel in pressure tubes where the inlet and outlet pressures were measured. In all the tests the inlet pressures were about 2.7 Bar and the outlet pressures were about 1.7 Bar. The tests were carried out within a temperature range of from 20 to 50° C. at a surrounding pressure of about 1.0 Bar. The cross-flow were about 35 m$^3$/h during the test runs. The test medias were 1) deionised water and 2) thin milk having refractive index equal to 4.6. The results are summarised in Table 2.

TABLE 2

| | | | Permeate tube of invention | | Permeate tube of prior art | |
| --- | --- | --- | --- | --- | --- | --- |
| Test No. | Temp. water ° C. | Temp. milk ° C. | Permeate flux milk dm$^3$/(m$^2$ × h) | Permeate flux water dm$^3$/(m$^2$ × h) | Permeate flux milk dm$^3$/(m$^2$ × h) | Permeate flux water dm$^3$/(m$^2$ × h) |
| 1 | 20 | 9 | 27 | 46 | 24 | 40 |
| 2 | 20 | 26 | 37 | 54 | 33 | 49 |
| 3 | 36 | 36 | 43 | 77 | 37 | 73 |
| 4 | 52 | 44 | 48 | 107 | 42 | 104 |
| 5 | 22 | 50 | 51 | 60 | 45 | 55 |
| 6 | 30 | 20 | 27 | 73 | 21 | 68 |
| 7 | 42 | 28 | 33 | 92 | 27 | 89 |
| 8 | 50 | 48 | 48 | 107 | 40 | 104 |
| 9 | 20 | 20 | 25 | 61 | 19 | 57 |
| 10 | 34 | 34 | 34 | 82 | 30 | 79 |
| 11 | 42 | 40 | 40 | 97 | 34 | 94 |
| 12 | 49 | 50 | 46 | 109 | 40 | 106 |
| 13 | 18 | 20 | 25 | 60 | 19 | 55 |
| 14 | 29 | 30 | 30 | 77 | 25 | 71 |
| 15 | 54 | 40 | 39 | 118 | 33 | 116 |
| 16 | 19 | 51 | 46 | 63 | 40 | 57 |
| 17 | 33 | 20 | 25 | 85 | 19 | 82 |
| 18 | 42 | 30 | 30 | 100 | 25 | 95 |
| 19 | 48 | 40 | 37 | 109 | 33 | 106 |
| 20 | | 50 | 45 | | 40 | |

The tests show that the spiral wound membrane of the invention drains better than the spiral wound membrane of the prior art. The tests show about 8 to 3% higher flux for water with the spiral wound membrane of the invention. When the test material was thin milk then results were 30 to 12% higher at refractive index equals to 4.6 and at temperatures within the temperature range from 20 to 50° C. for spiral wound membrane of the invention compared to the spiral wound membrane of the prior art. These tests show that the spiral wound membrane of the invention has better performance at low temperatures than that of the prior art. The tests show further that the spiral wound membrane of the invention has a better viscosity performance than that of the spiral wound membrane of the prior art.

The invention claimed is:

1. A permeate tube for a spiral wound membrane comprising:
   at least one tubular unit at least partially defined by a polygon-shaped inner cross-section;
   a plurality of permeate transfer means spaced substantially along a length of the tubular unit; and
   at least two external grooves helically circling a circumference of the tubular unit, with the permeate transfer means connected to the grooves at a point where the grooves intersect one another.

2. A permeate tube as defined by claim 1, wherein at least one of said tubular units is moulded.

3. The permeate tube according to claim 1, wherein the plurality of permeate transfer means are spaced along the length of the unit in one or more rows along the length of tubular unit.

4. The permeate tube according to claim 3, wherein the plurality of permeate transfer means, are spaced in two rows along the length of the unit and on diagonally opposite sides of the unit.

5. The permeate tube according to claim 1, wherein the unit has two grooves helically connecting the plurality of permeate transfer means around the unit and along the length of the unit.

6. The permeate tube according to claim 1, wherein the plurality of permeate transfer means are equally spaced or progressively space along the length of the unit.

7. The permeate tube according to claim 1, wherein the plurality of permeate transfer means are equally spaced along the length of the unit.

8. The permeate tube according to claim 1, wherein the unit is at least one of a tubular unit and two longitudinal half sections of a tubular unit fitted together along longitudinal half sides of sections forming the tubular unit.

9. The permeate tube according to claim 1, wherein the permeate tube is constructed of two or more tubular units fitted together end-to-end.

10. The permeate tube according to claim 1, wherein the permeate tube is constructed of at least one of tubular units comprising units having two end-parts and no fitting-part, units having one end-part and a fitting-part, units having two fitting-parts, and combinations thereof.

11. The permeate tube according to claim 1, wherein the inner side of the tubular unit has a square, hexagonal or octagonal cross-section.

12. The permeate tube according to claim 1, wherein the grooves have a depth within the range of from about 0.25 mm to about 2.5 mm.

13. The permeate tube according to claim 1, wherein the tube is fabricated of a polymeric material selected from polyethylene, polymethylpentene, polyphenylene sulfide, polypropylene, cellulosic polymers, acetal, acrylonitrile-butadienestyrefle (ABS), ABS-polycarbonate alloys, polystyrene, polystryene-butadiene, polyetherimide, polyvinyl chloride, polysulfone, polyetheretherketone (PEEK) or poly(phenylene oxide), or mixtures thereof.

14. A spiral wound membrane comprising a permeate tube according to claim 1 around which permeate tube area wound at least one of, one or more permeate transfer leaves, one or more membrane leaves and one or more space leaves.

15. A spiral wound membrane according to claim 14, wherein the membrane is operable for microfiltration, ultrafiltration, nanofiltration, or reverse osmosis.

16. A spiral wound membrane according to claim 14, wherein the membrane is operable in desalination procedures.

17. A spiral wound membrane according to claim 14, wherein said membrane is operable for treating proteins and protein products.

18. A spiral wound membrane according to claim 14, wherein said membrane is operable for treating milk and milk products.

19. A spiral wound membrane according to claim 14, wherein said membrane is operable for treating polysaccharides and polysaccharide products.

20. A spiral wound membrane according to claim 14, wherein said membrane is operable for treating starches and starch products.

21. A spiral wound membrane according to claim 14, wherein said membrane is operable for treating oils, vegetable oils and oil products.

22. A spiral wound membrane according claim 14, wherein the spiral wound membrane cartridge is operable at a temperature of at least 0° C.

* * * * *